US010592244B2

(12) United States Patent
Chynoweth et al.

(10) Patent No.: US 10,592,244 B2
(45) Date of Patent: Mar. 17, 2020

(54) BRANCH TYPE LOGGING IN LAST BRANCH REGISTERS

(71) Applicant: INTEL CORPORATION, Santa Clara, CA (US)

(72) Inventors: Michael W. Chynoweth, Rio Rancho, NM (US); Jonathan D. Combs, Austin, TX (US); Joseph K. Olivas, Folsom, CA (US); Beeman C. Strong, Portland, OR (US); Rajshree A. Chabukswar, Sunnyvale, CA (US); Ahmad Yasin, Kafr Manda (IL); Jason W. Brandt, Austin, TX (US); Ofer Levy, Atlit (IL); John M. Esper, Austin, TX (US); Andreas Kleen, Portland, OR (US); Christopher M. Chrulski, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 86 days.

(21) Appl. No.: 15/423,143

(22) Filed: Feb. 2, 2017

(65) Prior Publication Data
US 2018/0217839 A1 Aug. 2, 2018

(51) Int. Cl.
*G06F 9/30* (2018.01)

(52) U.S. Cl.
CPC .................................. *G06F 9/3005* (2013.01)

(58) Field of Classification Search
None
See application file for complete search history.

(56) References Cited

U.S. PATENT DOCUMENTS

| 6,115,810 A * | 9/2000 | Patel ..................... G06F 9/3848 712/233 |
| 2014/0372734 A1* | 12/2014 | Greathouse ........... G06F 9/3005 712/237 |
| 2014/0380027 A1* | 12/2014 | Yasin .................. G06F 11/3419 712/240 |

* cited by examiner

*Primary Examiner* — John M Lindlof
(74) *Attorney, Agent, or Firm* — Lowenstein Sandler LLP

(57) ABSTRACT

An example processor that includes a decoder, an execution circuit, a counter, and a last branch recorder (LBR) register. The decoder may decode a branch instruction for a program. The execution circuit may be coupled to the decoder, where the execution circuit may execute the branch instruction. The counter may be coupled to the execution circuit, where the counter may store a cycle count. The LBR register coupled to the execution circuit, where the LBR register may include a counter field to store a first value of the counter when the branch instruction is executed and a type field to store type information indicating a type of the branch instruction.

18 Claims, 12 Drawing Sheets

| 63 | 62 | 61 | 60 | 59:56 | 55:16 | 15:0 |
|---|---|---|---|---|---|---|
| Misprediction 302 | Transaction 304 | Abort 306 | Reserved 308 | Branch Type 310 | Reserved 312 | Counter 314 |

BRANCH TYPE LOGGING IN LAST BRANCH REGISTERS

BACKGROUND

A branch instruction is an instruction in a program that can cause a computer to begin executing a different instruction sequence, deviating from a default behavior of executing instructions in order. Information about the branch instruction may be stored in registers during execution of the program. The branch information may be used for system profiling, debugging, and optimization of memory transactions.

BRIEF DESCRIPTION OF THE DRAWINGS

Various embodiments of the present invention will be understood more fully from the detailed description given below and from the accompanying drawings of various embodiments of the invention.

FIG. 3 illustrates a block diagram of an LBR register with a type information field to store information indicating a type of a branch instruction according to one embodiment.

DESCRIPTION OF EMBODIMENTS

Figure 1:
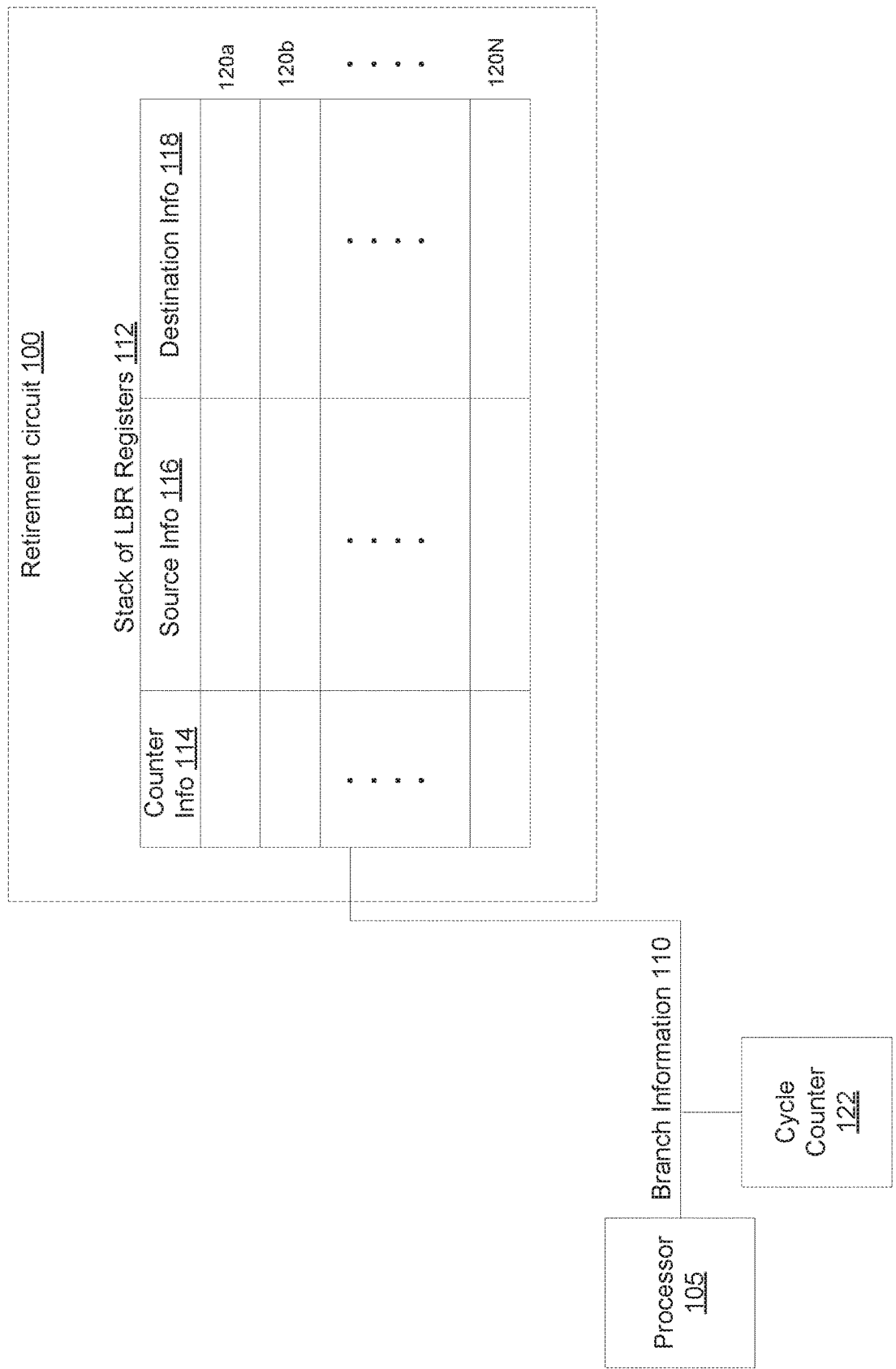
FIG. 1 illustrates a retirement circuit storing counter information in a stack of LBR registers according to one embodiment.

Performance analysis of programs often relies on measuring an amount of time it takes a set of instructions to be executed. For example, a processor may insert time stamp instructions before and after a set of instructions and use a time stamp counter (TSC) to measure an amount of time it takes to execute the set of instructions. However, time stamp counting by the time stamp instructions may impact workload run time of programs, may be intrusive as it changes characteristics of the original instructions of a program, may be inaccurate, and may not be used on a granular set of instructions.

Alternatively, performance analysis of programs may use information about a control flow of the set of instructions. The control flow information may include information that describes an order in which instructions of the set of instructions have been executed. The control flow information may also include information indicating control transfers, such as information on a location of a branch instruction in the set of instructions and where the branch instruction jumped.

The control flow information may include branch information indicating a set of branches taken while executing the set of instruction. A processor may implement a debugger that uses the control flow information to back trace the instructions and functions that led to the current point of execution. The processor may store the branch information in a set of model-specific registers (MSRs), also referred to herein as registers. For example, a processor may include a last branch record (LBR) stack of LBR registers for storing information regarding the branches taken during an execution of the set of instructions. Recording the branch information may be a time-consuming process and may cause significant runtime overheads.

The processor may filter the LBR information to determine the branch types stored in the LBR registers. To determine the types of branches, a profiler may filter the LBR information to include only a branch type of interest or the processor may disassemble the instructions into binary code and look up the branch that was executed in the binary code across executables, shared objects, and dynamically linked libraries. However, access to the executables, shared objects, and dynamically linked libraries may not be available while post processing the performance data. Additionally, disassembly of the instructions into binary code may cause significant runtime overheads.

The embodiments described herein may address the above-noted deficiencies by providing an LBR register with a type field to store information indicating a type of branch instruction stored in an LBR register. The LBR register may also include branch information fields to store source information, destination information, counter information, and so forth. The information indicating the type of branch information may be stored while a program is executing to avoid performance monitoring interrupts or disassembly of binary code that may reduce a performance of the program. The profiler may use the type information and counter information for performance analysis of the program and for determining a quality of the feedback-driven optimizations.

FIG. 1 illustrates a retirement circuit 100 storing counter information in a stack of LBR registers 112 according to one embodiment. The retirement circuit 100 may include a stack of LBR registers 112 (also referred to as a stack of MSRs registers) that includes LBR register 120a-120N. In one implementation, the stack of LBR registers 112 may be a call stack. The call stack may be a stack of LBR registers that is independent of a system call stack or other stacks stored in memory and used during program execution. In another implementation, the stack of LBR registers 112 may be a data structure array circuit.

When a processor takes a branch in the set of instructions, the processor 105 may send branch information 110 to the retirement circuit 100. The retirement circuit 100 may store the branch information 110 at one of the LBR registers 120a-120N. The branch information 110 may include counter information.

An LBR register 120a-120N may include a counter information field 114, a source information field 116, and a destination information field 118. The counter information field 114 may be a bit field that represents a bit pattern indicating a count of cycles elapsed since a branch information from a previously branch instruction was received at the retirement circuit 100. The cycles may be core clock cycles of a processor 105. The source information field 116 may store information that represents a location of the branch instruction in the set of instructions. The destination information field 118 may store information that represents a location where the branch instruction in the set of instructions. For example, the destination information field 118 may store destination information that is an address instruction point (IP) of a target of a branch instruction. When the branch information 110 is received, the retirement circuit 100 may parse the branch information and store the counter information, the source information, and the destination information in the respective data fields of the LBR registers 120a-120N.

In one implementation, the retirement circuit 100 may receive the counter information data from the processor 105. In another implementation, the retirement circuit 100 may receive the counter information data from a cycle counter 122. The cycle counter 122 may track the cycles of the processor 105. For example, the cycle counter 122 may increment the counter with each increment of the core clock of the processor 105. When the retirement circuit 100 receives the branch information 110, the current value from the cycle counter 130 may be sampled and stored in the counter information field 114. In one implementation, the value from the cycle counter 122 may be counted sequentially upward. In another implementation, the value of the cycle counter 122 may be counted relative to a last LBR entry, (e.g., between two subsequent entries to LBR registers 120a-N) to indicate a period between each branch instruction. When the counter information data is stored in the counter information field 114, the current value of the cycle counter 122 may be reset. In one example, the counter value may be a number of cycles of a processor since addition of an immediately-previous register register to a current register, where the cycles comprise at least one of core clock cycles of the processor or one or more reference clock cycles of the processor The size (e.g., n bits) of the counter information field 114, the source information field 116, and the destination information field 118 may vary based on a design of the processor 105. In one example, the counter information field 114, the source information field 116, and the destination information field 118 implementation, the counter information field 114 may each be 16 bits in size. However, the size of the counter information field 114, the source information field 116, and the destination information field 118 are not intended to be limiting. For example, a size of the counter information field 114 may correlate to a number of cycles that the counter information field 114 may represent. When the counter information field 114 is 16 bits in size, the counter information field 114 may store up to approximately 65,536 cycles (e.g., 2^16). The counter information may be used to track an amount of time it takes to execute a set of instruction or a portion of a set of instructions. For example, the processor 105 may use the counter information to determine an amount of time it takes to execute a set of instructions that between a first branch instruction and a second branch instruction.

Figure 2:
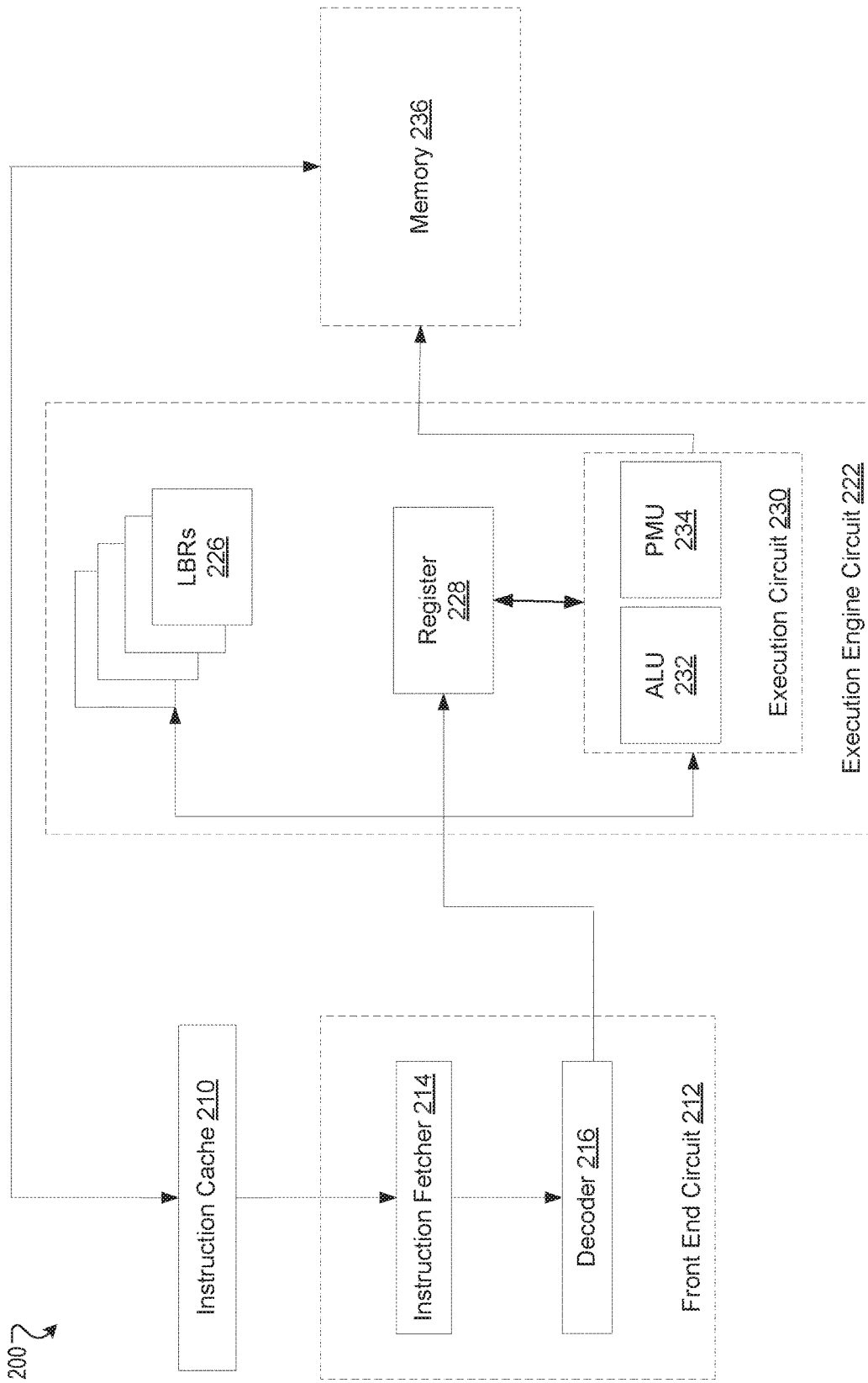
FIG. 2 illustrates a block diagram of a system that includes a front end circuit, an execution engine circuit, and a memory according to one embodiment.

FIG. 2 illustrates a block diagram of a system 200 that includes a front end circuit 212, an execution engine circuit 222, and a memory 236 according to one embodiment. In one implementation, the system 200 may be a multi-stage pipelined out-of-order processor. In another implementation, the system 200 is a computing device, a smartphone or mobile phone, a tablet computing device, and so forth. The front end circuit 212 may be coupled to an instruction cache 210 that stores a set of instructions. The front end circuit 212 may include an instruction fetcher 214 and a decoder 216. The instruction fetcher 214 may fetch a set of instructions from the instruction cache 210 and send it to decoder 216. The decoder 216 may decode the set of instructions and send the one or more instructions of the set of instructions to the execution engine circuit 222.

The execution engine circuit 222 may include a stack of LBR registers 226, a register 228, and an execution circuit 230. As discussed herein, the stack of LBR registers 226 may store branch information and type information for branches taken while executing the instructions. The execution circuit may include an arithmetic logic unit (ALU) 232 and a performance monitoring unit (PMU) 234. The ALU 232 may perform arithmetic and logic operations on operands in the instructions, such as fixed-point operations, floating-point operations, and so forth. The PMU 234 may generate counter information, retrieve information from the stack of LBR registers 226, and so forth. The register 228 may include register files for integer and floating point operations performed by the ALU 232.

The execution circuit 230 may be coupled to the memory 236. In one implementation, the memory 236 may be cache, such as a low-level cache. In another implementation, the memory 236 may be an external memory device coupled to the front end circuit 212 and the execution engine circuit 222. The memory 236 may store branch information received from the stack of LBR registers 226. For example, the PMU 234 may control the generation and sending of branch information and type information from LBR registers 226 to the memory 236.

A performance optimizer may access the branch information and us it to analyze the branch information and determine a performance of the set of instructions. For example, the performance optimizer may use the type information to perform feedback driven optimizations and evaluate a quality of profile-guided optimizations. The performance optimizer may also use the type information to determine the types of branches that may cause issues with code locality without having to disassemble the binary. For example, the performance optimizer may use the type information to determine the type of branches that cause instruction translation lookaside buffer (ITLB) misses or instruction cache misses for instruction cache debug and whether they are mispredicting using the misprediction information in the LBR register 226.

FIG. 3 illustrates a block diagram of an LBR register 226 with a branch type field 310 to store information indicating a type of a branch instruction according to one embodiment. Some of the features in FIG. 3 are the same or similar to some of the features in FIG. 2 as noted by same reference numbers, unless expressly described otherwise.

The LBR register 226 may include a misprediction field 302, a transaction field 304, an abort field 306, a first reserved field 308, a branch type field 310, a second reserved field 312, and a counter field 314. The misprediction field 302 may store one or more bits indicating whether a branch of a branch instruction has been mispredicted by the processor. In one example, the misprediction field 302 may be a single bit. The transaction field 304 may store one or more bits indicating whether the branch instruction is in a transactional region in a set of instructions. The abort field 306 may store one or more bits indicating that the branch instruction has been aborted. The reserved fields 308 and 312 may be fields that are reserved for a future use. The branch type field 310 may store bits indicating a type of a branch instruction. The types of the branch instruction may a conditional instruction, an indirect jump instruction, a direct jump instruction, a direct call instruction, an indirect call instruction, a return instruction, and a far branch instruction. The types of the branch instructions are not intended to be limiting and may include other types of branch instructions. The counter field 314 stores bits indicating a count of an elapsed time of a processor clock since the branch information or the type information was stored in a previous LBR register in a stack of LBR registers. For example, the processor may use a count value to determine an amount of time taken to execute a set of instructions. The processor may also use the information stored in one or more of the fields 302-314 to construct a control flow sequence indicating an order in which individual statements, instruction, function calls that have been executed as part of a program. The counter information may be used to sort the individual statements, instruction, function calls and the type information may be used to filter the individual statements, instruction, function calls.

In one implementation, LBR register 226 may be 64 bits in size. The counter field 314 may be 16 bits in size (bits 0-15 of the LBR register 226). The second reserved field 312 may be 41 bits in size (bits 16-55 of the LBR register 226). The branch type field 310 may be 4 bits in size (bits 56-59 of the LBR register 226). The first reserved field 308 may be 1 bit in size (bit 60 of the LBR register 226). The abort field 306 may be 1 bit in size (bit 61 of the LBR register 226). The transaction field 304 may be 1 bit in size (bit 62 of the LBR register 226). The misprediction field 302 may be 1 bit in size (bit 63 of the LBR register 226).

The size and types of fields included in the LBR register 226 are not intended to be limiting. In one example, the LBR register 226 may include a source information field indicating a source address of a branch or a destination information field indicating a destination address of a branch. In another example, the LBR register 226 may be 128 bits in size.

Figure 4A:
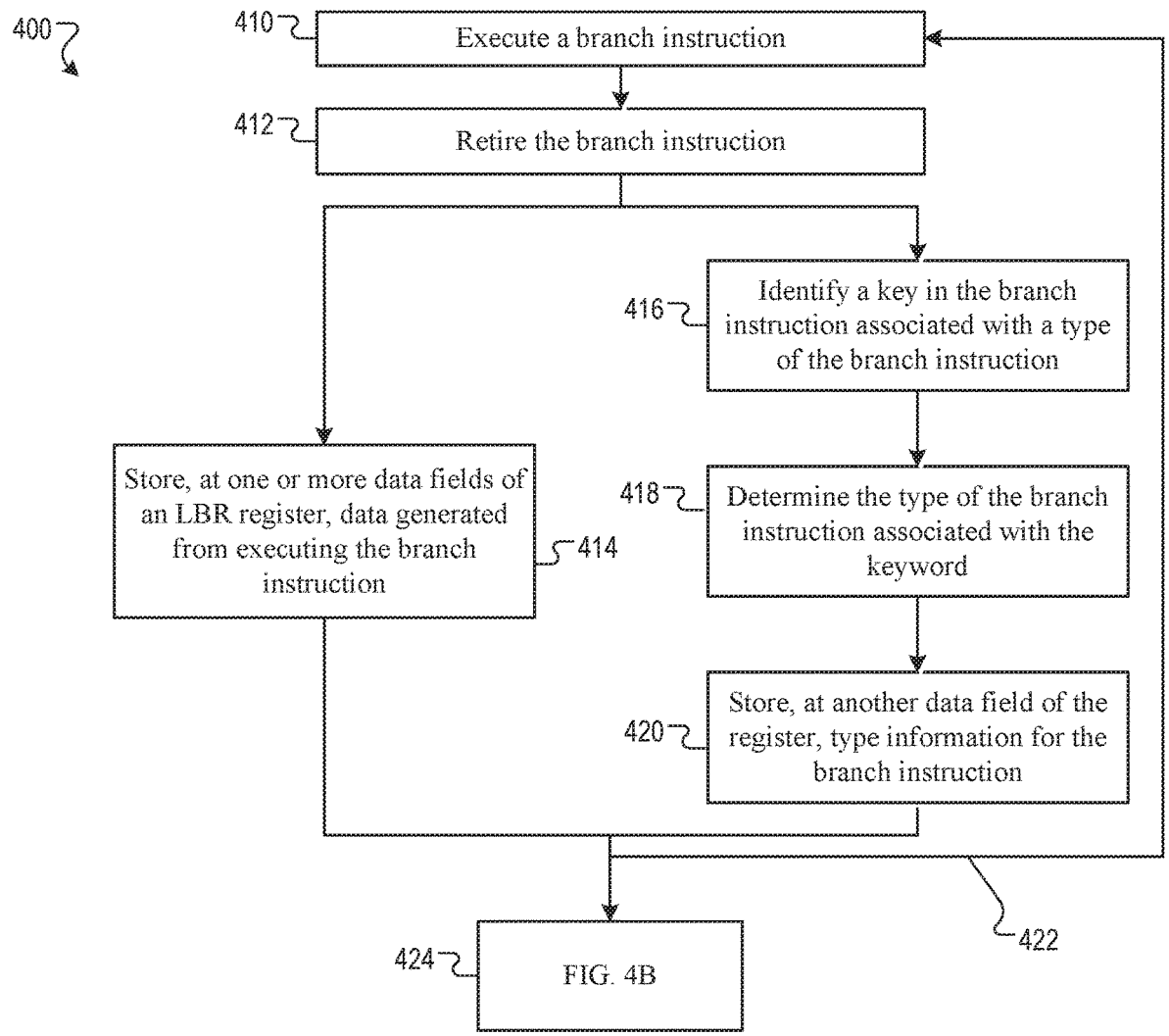
FIG. 4A illustrates a flowchart of a method for storing information indicating a type of a branch instruction in an LBR register according to one embodiment.

FIG. 4A illustrates a flowchart of a method 400 for storing information indicating a type of a branch instruction in an LBR register according to one embodiment. The method 400 may at least partially be performed by processing logic that includes hardware (e.g., circuitry, dedicated logic, programmable logic, microcode, etc.), software (e.g., instructions executed by a processing device), firmware or a combination thereof. In one embodiment, the method 400 may be performed by all or part of the retirement circuit 100 of FIG. 1 or the system 200 of FIG. 2. For example, the method 400 may be performed by the processor 105, the front end circuit 212, or the executing engine circuit 222.

Referring to FIG. 4A, the method 400 begins with a processor executing a branch instruction (block 410). Below is an example of an identification of a set of branch instructions:
  NONE=3'b000;
  BR_TYPE_JUMP_CC_FROM_AF=3'b001; //JCC
  BR_TYPE_JUMP_TARG_IND=3'b010; //JMP INDIR
  BR_TYPE_JUMP_TARG_DIR=3'b011; //JMP DIR
  BR_TYPE_CALL_DIR_STORE=3'b100; //CALL DIR
  BR_TYPE_CALL_IND_STORE=3'b101;      //CALL INDIR
  BR_TYPE_RETURN=3'b110; //RET
  BR_TYPE_SIGNAL_EVENT_JUMP=3'b111;     //FAR BRANCH The method may include retiring the branch instruction, such as an indirect call instruction (block 412). A set of branch instructions may include speculative branch instructions and program flow branch instructions. The speculative branch instructions may be branch instructions that are included in a set of instructions but may not be executed by a processor as part of a program flow. A program flow branch instruction may be a branch instruction that is executed by the processor as part of a program flow. When the program flow branch instruction is executed as part of a program flow, the branch instruction is retired.

The method may include the processor storing data generated by executing the branch instruction at one or more data fields of an LBR register (block 414). For example, the processor may store a bit pattern of 101 to a field in the LBR register to indicate an indirect call instruction has been retired. The indirect call instruction may be retired when the type information is stored in the type field in response to executing the indirect call instruction in-order with a set of instructions. The data generated from executing the branch instruction may include misprediction information, transaction information, abort information, or counter information.

The method may include the processor identifying a key in a branch instruction associated with a type of the branch instruction (block 416). The key may be a sequence of one or more letters or symbols. The processor may identify the keywords none, jump_CC_from_AF, jump_targ_ind, jump_targ_dir, call_dir_store, call_ind_store, return, and signal_event_jump in the pseudocode. The processor may then query a lookup table in a memory to identify the types of branch instructions associated with the keywords.

Figure 4B:
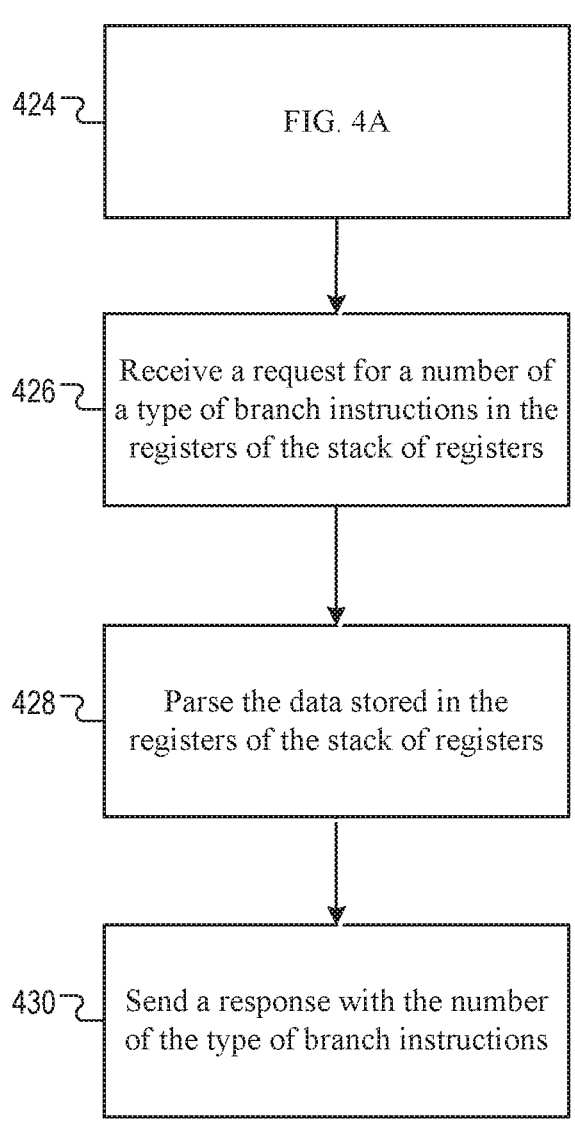
FIG. 4B illustrates a flowchart of a method for sending a number of a type of branch instruction according to one embodiment.

The method may include the processor determining the type of branch instruction associated with the key (block 418). For example, the processor may query a database to identify the type information associated with the key. The method may include the processor storing, at another data field of the register, type information for the branch instruction (block 420). For example, the processor may store a bit pattern in a type field to indicate a type of branch that has been executed. In one example, the register that stores the type information and other information may be an LBR register In one example, the block 414 may be performed in parallel with blocks 416-420. The method may include iteratively performing blocks 410-420 for one or more registers in a stack of registers (block 422). For example, the processor may be coupled to a memory with a stack of LBR registers. The processor may iteratively perform blocks 410-420 for the data stored in each LBR register in the stack. As discussed below, the method 400 in FIG. 4A may continue to method 425 in FIG. 4B FIG. 4B illustrates a flowchart of a method 425 for sending a number of a type of branch instruction according to one embodiment. In one embodiment, method 425 may continue from block 424 in FIG. 4A. In another embodiment, the method 425 may be independent of method 400 in FIG. 4A. The method 425 may include receiving a request from a program or device for a number of a type of branch instructions in the registers of the stack of registers (block 424). The method may include the processor parsing the data stored in the registers to determine the number of the type of branch instructions (block 426). For example, the processor may filter the stack of registers to include only the registers with the type of branch instruction in the request and count the number of registers remaining. The method may include the processor sending a response indicating the number of the type of branch instructions in the stack (block 428).

Figure 5:
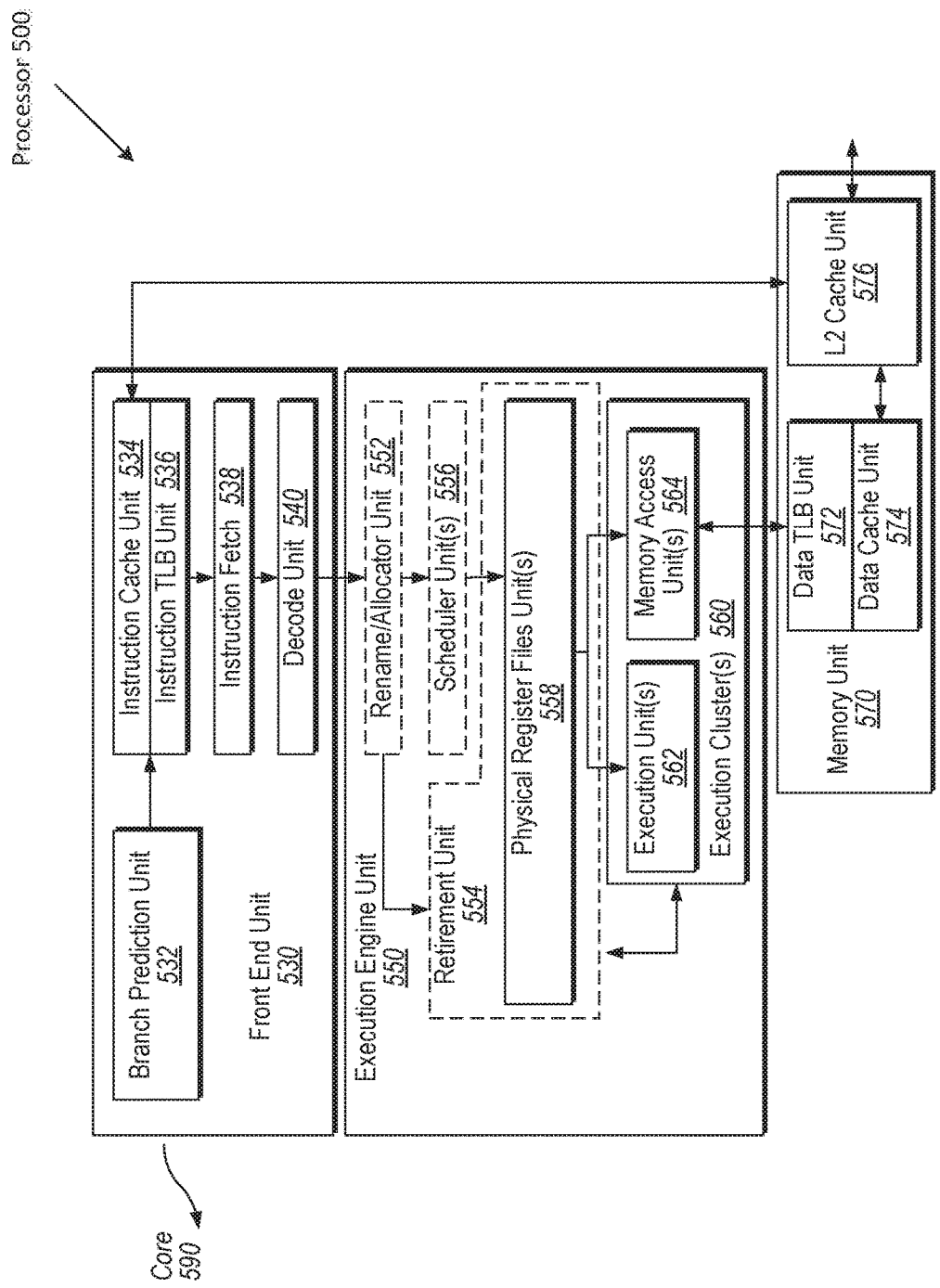
FIG. 5 is a block diagram illustrating a micro-architecture for the system of FIG. 2, according to one embodiment.

FIG. 5 is a block diagram illustrating a micro-architecture for a processor 500 that implements the retirement circuit 100 of FIG. 1 or the system 200 of FIG. 2 according to one embodiment. Specifically, processor 500 depicts an in-order architecture core and a register renaming logic, out-of-order issue/execution logic to be included in a processor according to at least one embodiment of the disclosure. The embodiments of the retirement circuit 100 of FIG. 1 or the system 200 of FIG. 2 may be implemented in processor 500.

Processor 500 includes a front end unit 530 coupled to an execution engine unit 550, and both are coupled to a memory unit 570. The processor 500 may include a core 590 that is a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In another embodiment, the core 590 may have five stages.

The front end unit 530 includes a branch prediction unit 532 coupled to an instruction cache unit 534, which is coupled to an instruction translation lookaside buffer (TLB) unit 536, which is coupled to an instruction fetch unit 538, which is coupled to a decode unit 540. The decode unit 540 (also known as a decoder) may decode instructions, and generate as an output one or more micro-operations, microcode entry points, microinstructions, other instructions, or other control signals, which are decoded from, or which otherwise reflect, or are derived from, the original instructions. The decode unit 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an address instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in order.

The set of memory access units 564 is coupled to the memory unit 570, which may include a data prefetcher, a data TLB unit 572, a data cache unit (DCU) 574, and a level 2 (L2) cache unit 576, to name a few examples. In some embodiments, DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to the main memory.

In one embodiment, the data prefetcher speculatively loads/prefetches data to the DCU 574 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may not support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology)).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 6:
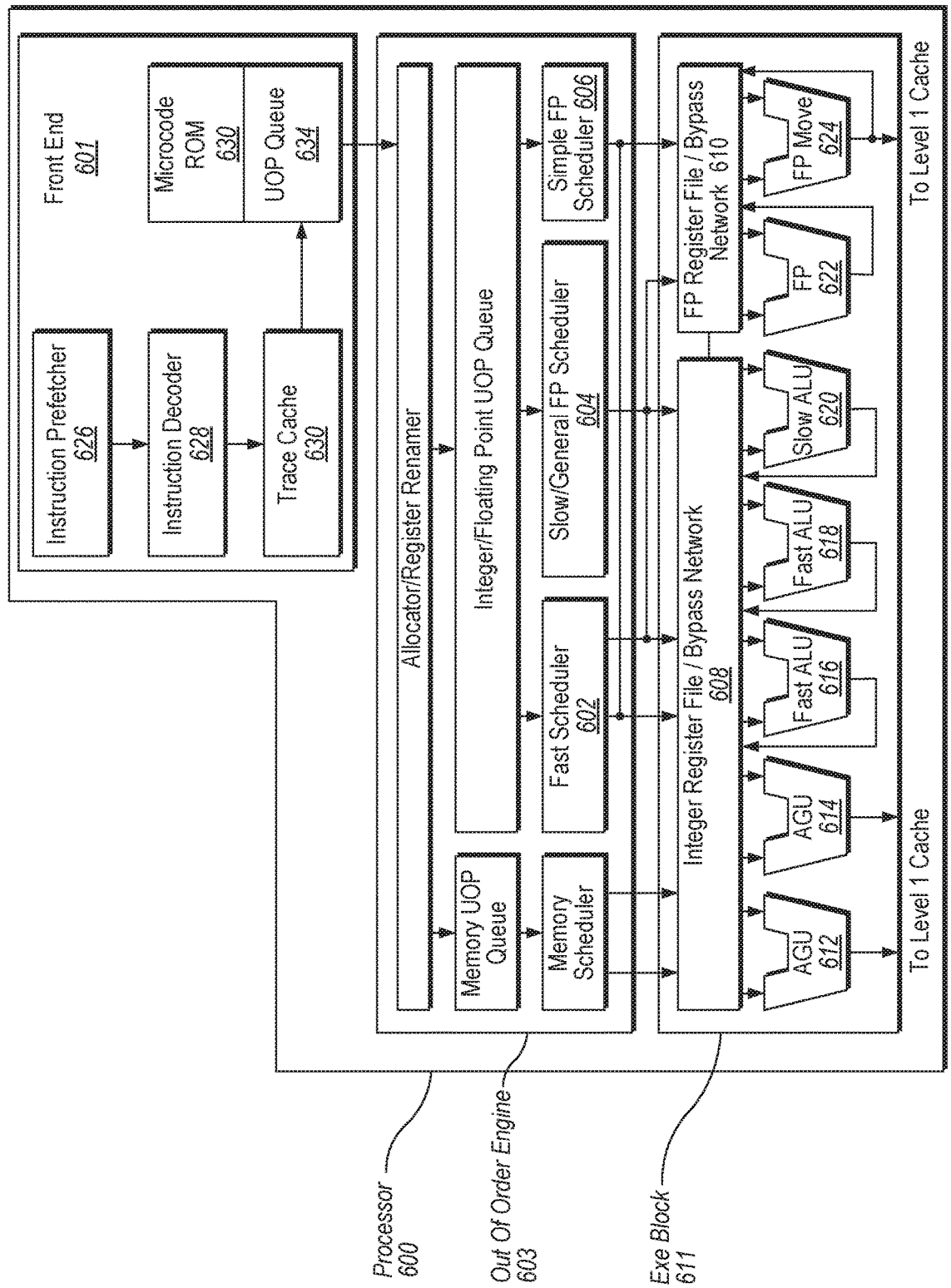
FIG. 6 illustrates a block diagram of the micro-architecture for a processor that includes logic circuits to perform access control, according to one embodiment.

FIG. 6 illustrates a block diagram of the micro-architecture for a processor 600 that includes logic circuits to perform access control according to one embodiment. In one embodiment, processor 600 is the retirement circuit 100 of FIG. 1 or the system 200 of FIG. 2.

In some embodiments, an instruction in accordance with one embodiment may be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline. The embodiments of the retirement circuit 100 of FIG. 1 or the system 200 of FIG. 2 may be implemented in processor 600.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro-op or uops) that the machine may execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 618 accesses the microcode ROM 632 to do the instruction. For one embodiment, an instruction may be decoded into a small number of micro-ops for processing at the instruction decoder 618. In another embodiment, an instruction may be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the micro-code, ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment may schedule on each half of the main clock cycle while the other schedulers may only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that may bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64-bit by 64-bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment may execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64-bit data operands. In alternative embodiments, the ALUs 616, 618, 620, may be implemented to support a variety of data bits including 16, 32, 128, 256, etc. Similarly, the floating point units 622, 624, may be implemented to support a range of operands having bits of various widths. For one embodiment, the floating point units 622, 624, may operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement access control according to one embodiment. In one embodiment, the execution block 611 of processor 600 may include PEL, to perform access control according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128 bits wide XMM registers relating to SSE2, SSE3, SSE4, or beyond (referred to generically as "SSEx") technology may also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
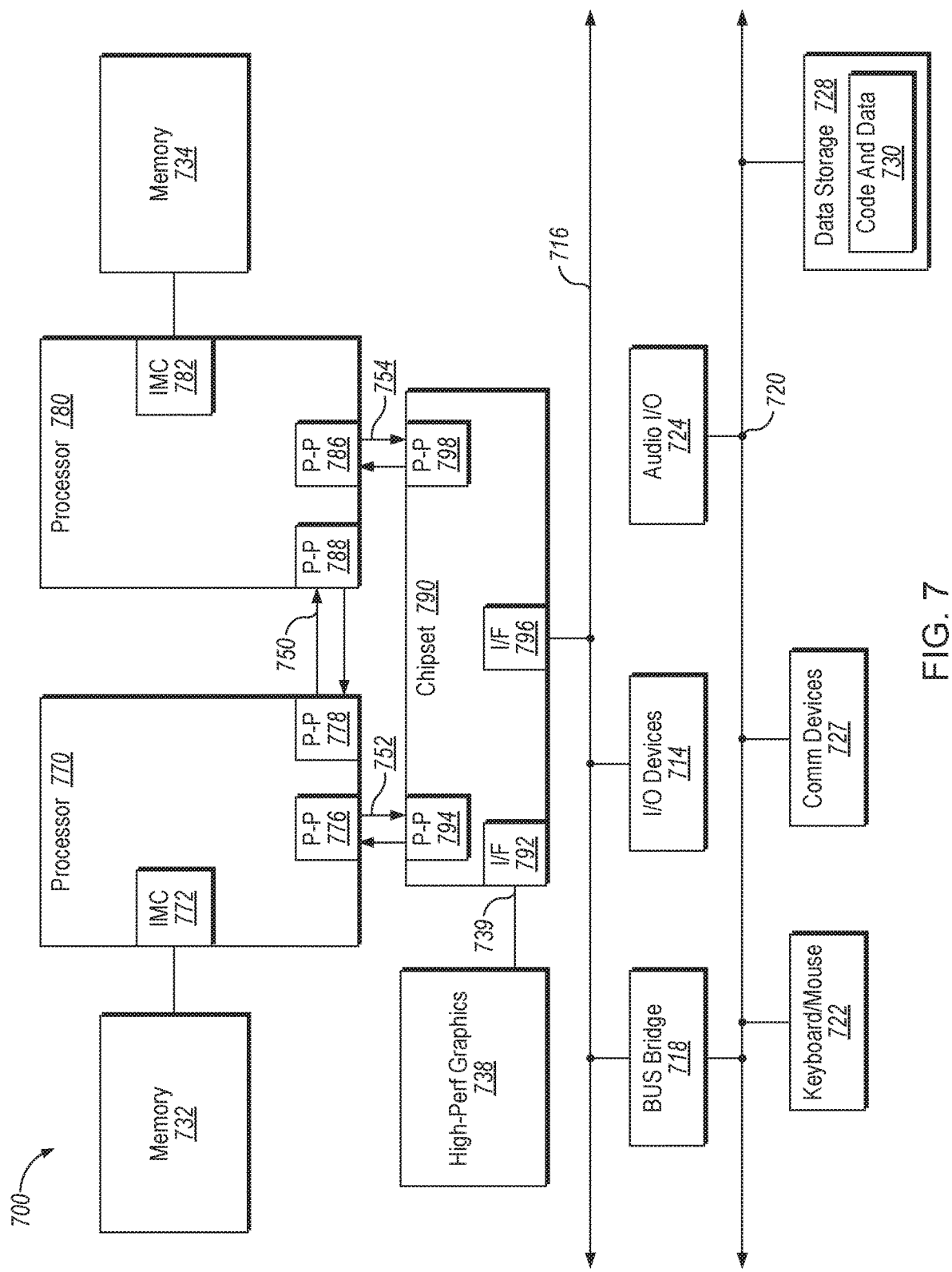
FIG. 7 is a block diagram of a computing system according to one implementation.

Embodiments may be implemented in many different system types. Referring now to FIG. 7, shown is a block diagram of a multiprocessor system 700 in accordance with an implementation. As shown in FIG. 7, multiprocessor system 700 is a point-to-point interconnect system and includes a first processor 770 and a second processor 780 coupled via a point-to-point interconnect 750. As shown in FIG. 7, each of processors 770 and 780 may be multicore processors, including first and second processor cores (i.e., processor cores 774*a* and 774*b* and processor cores 784*a* and 784*b*), although potentially many more cores may be present in the processors. The processors each may include hybrid write mode logics in accordance with an embodiment of the present. The embodiments of the retirement circuit 100 of FIG. 1 or the system 200 of FIG. 2 may be implemented in the processor 770, processor 780, or both.

While shown with two processors 770, 780, it is to be understood that the scope of the present disclosure is not so limited. In other implementations, one or more additional processors may be present in a given processor.

Processors 770 and 780 are shown including integrated memory controller units 782 and 782, respectively. Processor 770 also includes as part of its bus controller units point-to-point (P-P) interfaces 776 and 788; similarly, second processor 780 includes P-P interfaces 786 and 788. Processors 770, 780 may exchange information via a point-to-point (P-P) interface 750 using P-P interface circuits 786, 788. As shown in FIG. 7, IMCs 782 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, the first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
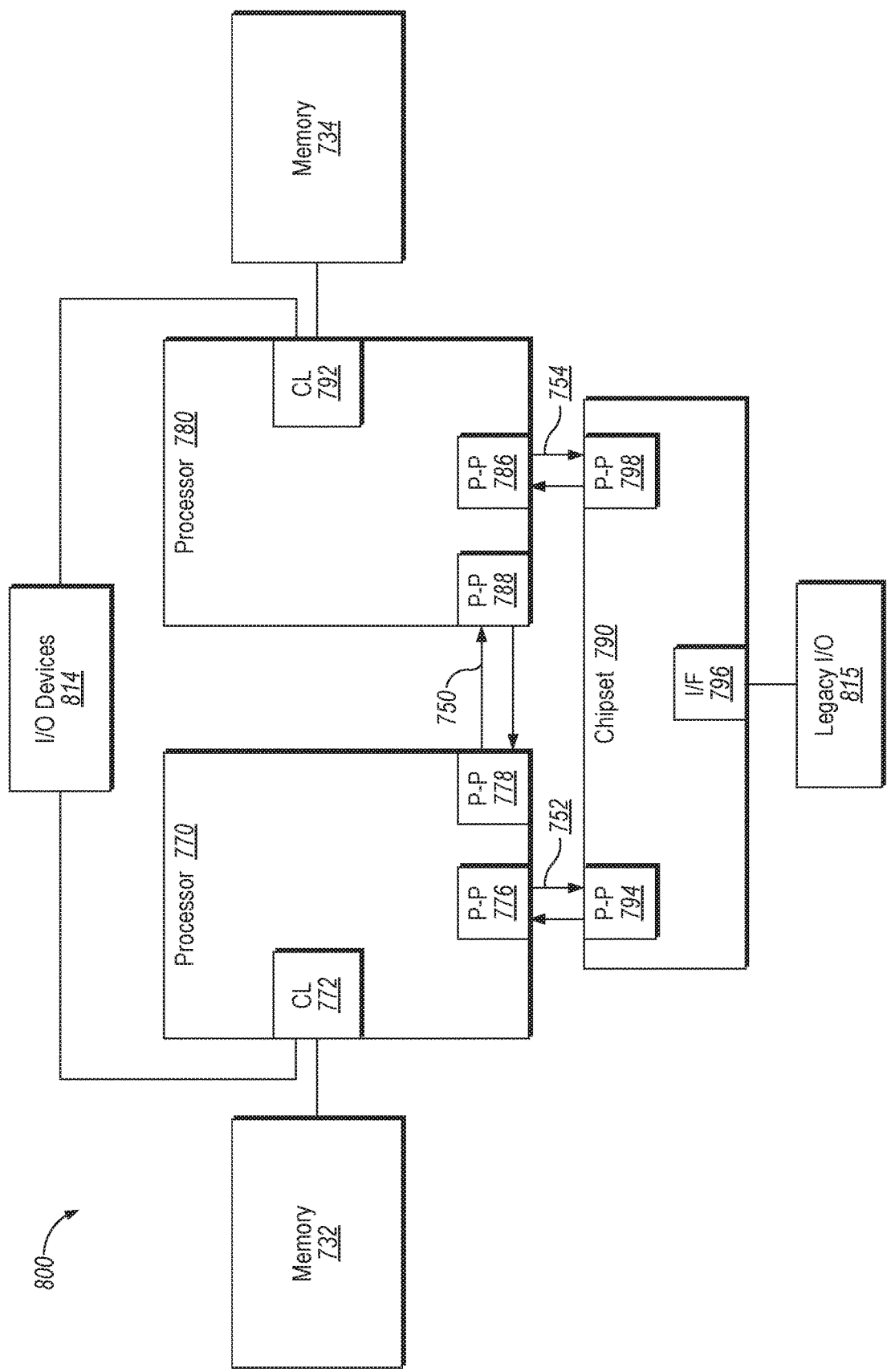
FIG. 8 is a block diagram of a computing system according to another implementation.

Referring now to FIG. 8, shown is a block diagram of a third system 800 in accordance with an embodiment of the present disclosure. Like elements in FIGS. 6 and 8 bear like reference numerals and certain aspects of FIG. 6 have been omitted from FIG. 8 in order to avoid obscuring other aspects of FIG. 8.

FIG. 8 illustrates that the processors 770, 780 may include integrated memory and I/O control logic ("CL") 772 and 782, respectively. For at least one embodiment, the CL 772, 782 may include integrated memory controller units such as described herein. In addition. CL 772, 782 may also include I/O control logic. FIG. 8 illustrates that the memories 732, 734 are coupled to the CL 772, 782, and that I/O devices 814 are also coupled to the control logic 772, 782. Legacy I/O devices 815 are coupled to the chipset 790. The embodiments of the system 200 may be implemented in processor 770, processor 780, or both.

Figure 9:
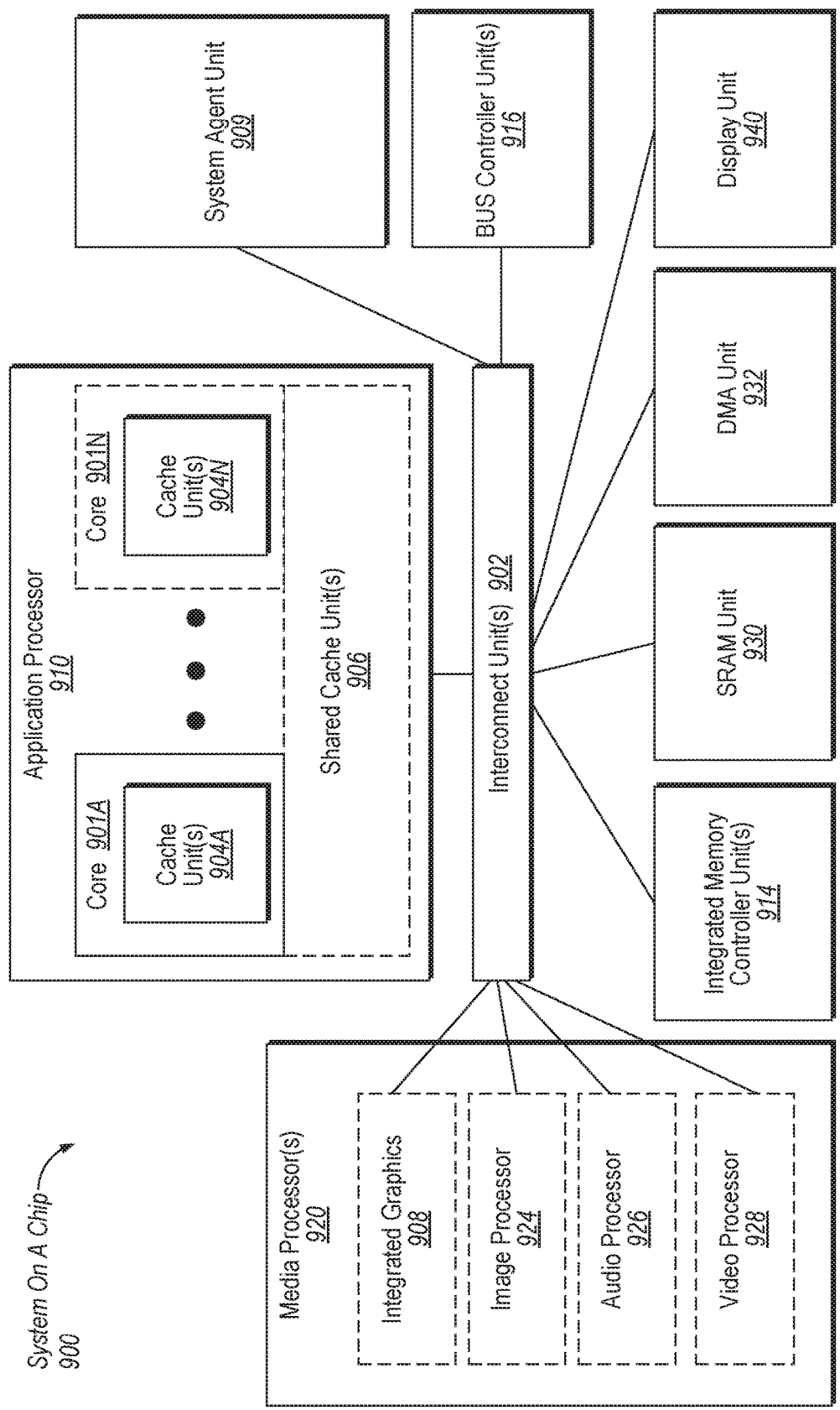
FIG. 9 is a block diagram of a system-on-a-chip according to one implementation.

FIG. 9 is an exemplary system on a chip (SoC) 900 that may include one or more of the cores 901. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Referring now to FIG. 9, shown is a block diagram of a SoC 900 in accordance with an embodiment of the present disclosure. Also, dashed lined boxes are features on more advanced SoCs. In FIG. 9, an interconnect unit(s) 902 is coupled to: an application processor 910 which includes a set of one or more cores 901A-N and shared cache unit(s) 906; a system agent unit 909; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; a static random access memory (SRAM) unit 930; a direct memory access (DMA) unit 932; and a display unit 940 for coupling to one or more external displays. The embodiments of the pages additions and content copying may be implemented in SoC 900.

Figure 10:
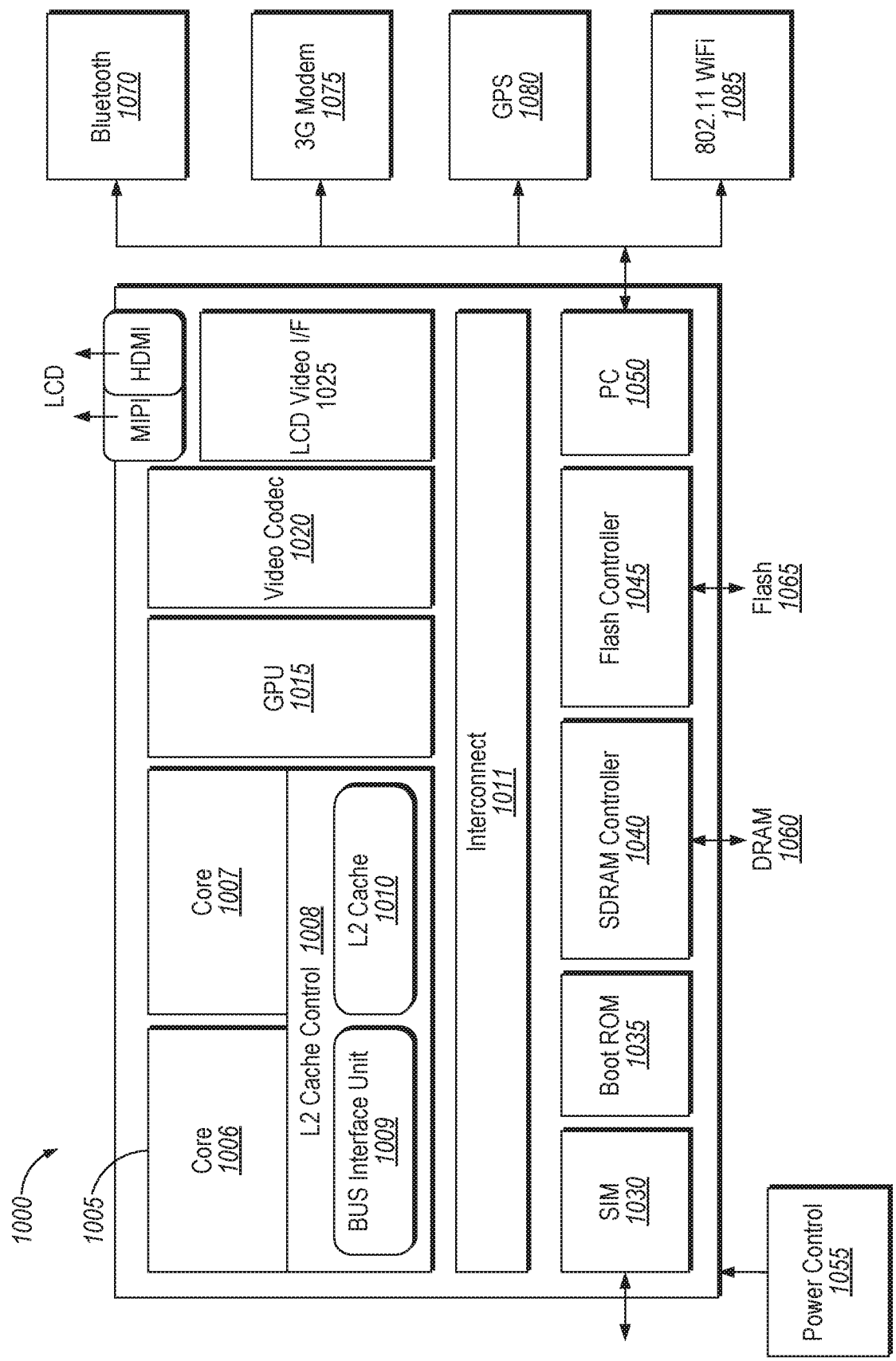
FIG. 10 illustrates another implementation of a block diagram of a computing system.

Turning next to FIG. 10, an embodiment of a system-on-a-chip (SoC) design in accordance with embodiments of the disclosure is depicted. As an illustrative example, SoC 1000 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which may correspond in nature to a mobile station (MS) in a GSM network. The embodiments of the retirement circuit 100 of FIG. 1 or the system 200 of FIG. 2 may be implemented in SoC 1000.

Here, SoC 1000 includes 2 cores—1006 and 1007. Similar to the discussion above, cores 1006 and 1007 may conform to an Instruction Set Architecture, such as a processor having the Intel® Architecture Core™, an Advanced Micro Devices, Inc. (AMD) processor, an MIPS-based processor, an ARM-based processor design, or a customer thereof, as well as their licensees or adopters. Cores 1006 and 1007 are coupled to cache control 1008 that is associated with bus interface unit 1009 and L2 cache 1010 to communicate with other parts of system 1000. Interconnect 1011 includes an on-chip interconnect, such as an IOSF, AMBA, or other interconnects discussed above, which may implement one or more aspects of the described disclosure.

Interconnect 1011 provides communication channels to the other components, such as a Subscriber Identity Module (SIM) 1030 to interface with a SIM card, a boot ROM 1035 to hold boot code for execution by cores 1006 and 1007 to initialize and boot SoC 1000, a SDRAM controller 1040 to interface with external memory (e.g. DRAM 1060), a flash controller 1045 to interface with non-volatile memory (e.g. Flash 1065), a peripheral control 1050 (e.g. Serial Peripheral Interface) to interface with peripherals, video codecs 1020 and Video interface 1025 to display and receive input (e.g. touch-enabled input), GPU 1015 to perform graphics related computations, etc. Any of these interfaces may incorporate aspects of the embodiments described herein.

In addition, the system illustrates peripherals for communication, such as a Bluetooth module 1070, 3G modem 1075, GPS 1080, and Wi-Fi 1085. Note as stated above, a UE includes a radio for communication. As a result, these peripheral communication modules may not all be included. However, in a UE some form of a radio for external communication should be included.

Figure 11:
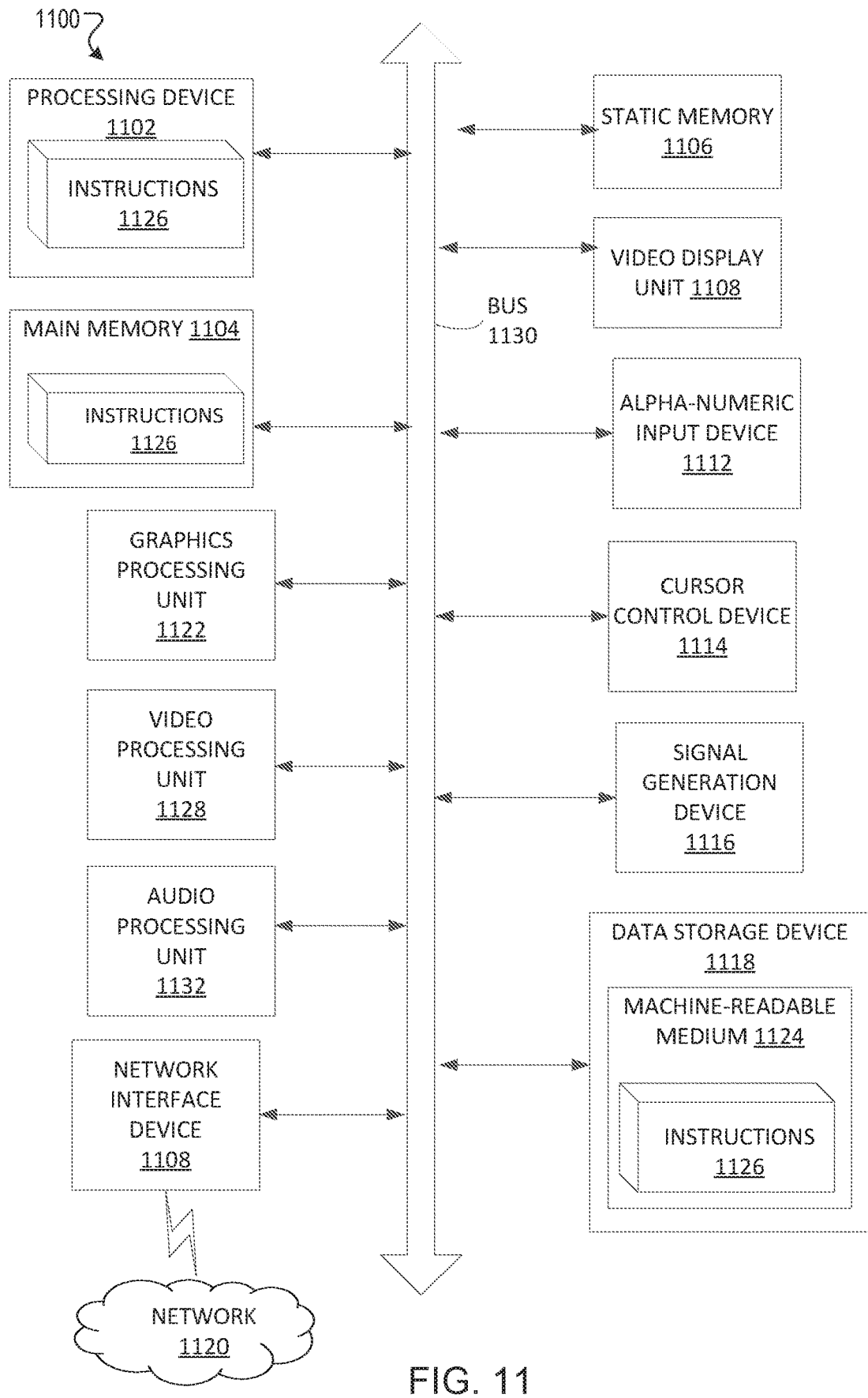
FIG. 11 illustrates another implementation of a block diagram of a computing system.

FIG. 11 illustrates a diagrammatic representation of a machine in the example form of a computing system 1100 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the retirement circuit 100 of FIG. 1 or the system 200 of FIG. 2 may be implemented in computing system 1100.

The computing system 1100 includes a processing device 1102, main memory 1104 (e.g., read-only memory (ROM), flash memory, dynamic random access memory (DRAM) (such as synchronous DRAM (SDRAM) or DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, central processing unit, or the like. More particularly, the processing device may be a complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field-programmable gate array (FPGA), a digital signal processor (DSP), network processor, or the like. In one embodiment, processing device 1102 may include one or processor cores. The processing device 1102 is configured to execute the instructions 1126 (e.g., processing logic) for performing the operations discussed herein. In one embodiment, processing device 1102 may include the system 200 of FIG. 2. Alternatively, the computing system 1100 may include other components as described herein. It should be understood that the core may not support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology)).

The computing system 1100 may further include a network interface device 1108 communicably coupled to a network 1120. The computing system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a signal generation device 1116 (e.g., a speaker), or other peripheral devices. Furthermore, computing system 1100 may include a graphics processing unit 1122, a video processing unit 1128 and an audio processing unit 1132. In another embodiment, the computing system 1100 may include a chipset (not illustrated), which refers to a group of integrated circuits, or chips, that are designed to work with the processing device 1102 and controls communications between the processing device 1102 and external devices. For example, the chipset may be a set of chips on a motherboard that links the processing device 1102 to very high-speed devices, such as main memory 1104 and graphic controllers, as well as linking the processing device 1102 to lower-speed peripheral buses of peripherals, such as USB, PCI or ISA buses.

The data storage device 1118 may include a computer-readable storage medium 1124 on which is stored instructions 1126 (e.g., software) embodying any one or more of the methodologies of functions described herein. The instructions 1126 (e.g., software) may also reside, completely or at least partially, within the main memory 1104 as instructions 1126 and/or within the processing device 1102 as processing logic during execution thereof by the computing system 1100; the main memory 1104 and the processing device 1102 also constituting computer-readable storage media.

The computer-readable storage medium 1124 may also be used to store instructions 1126 utilizing the processing device 1102, such as the processor 105 described with respect to FIG. 1 or the system 200 described with respect to FIG. 2, and/or a software library containing methods that call the above applications. While the computer-readable storage medium 1124 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processor including: 1) a decoder to decode a first branch instruction for a program; 2) an execution circuit coupled to the decoder, the execution circuit to execute the first branch instruction; 3) a counter coupled to the execution circuit, the counter to store a cycle count; 4) a first last branch record (LBR) register coupled to the execution circuit, wherein the first LBR register including: a) a counter field to store a first value of the counter when the first branch instruction is executed; and b) a type field to store type information indicating a type of the first branch instruction.

In Example 2, the processor of Example 1, where the execution circuit is to: 1) identify a key in the first branch instruction associated with the type of the first branch instruction, wherein the key is a sequence of one or more letters or symbols; 2) query a lookup table to identify the type information associated with the key; and 3) store the type information at the type field.

In Example 3, the processor of any one of Examples 1-2, where the execution circuit is to store the type information in the type field when the execution circuit has executed the first branch instruction in-order with a set of instructions.

In Example 4, the processor of any one of Examples 1-3, where the execution circuit is to identify the key, query the database, and store the type information at the type field while executing the program.

In Example 5, the processor of any one of Examples 1-4, where the execution circuit further comprises a second register comprising: 1) a counter field to store a second value of the counter when a second branch instruction is executed; and 2) an type field to store type information indicating a type of the second branch instruction.

In Example 6, the processor of any one of Examples 1-5, where the first LBR register further includes: 1) a source information field to store source information for the branch instruction; and 2) a destination information field to store destination information for the branch instruction.

In Example 7, the processor of any one of Examples 1-6, where the first LBR register is a model specific register (MSR).

In Example 8, the processor of any one of Examples 1-7, where the first LBR register is one of a stack of MSRs for storing information for a plurality of branch instructions.

In Example 9, the processor of any one of Examples 1-8, where the type of the first branch instruction is one of a conditional instruction, an unconditional instruction, an indirect jump instruction, a direct jump instruction, a direct call instruction, an indirect call instruction, a return instruction, or a far instruction.

In Example 10, the processor of any one of Examples 1-9, where the type field of the first LBR register includes 4 bits.

Various embodiments can have different combinations of the structural features described above. For instance, all optional features of the computing system described above can also be implemented with respect to the method or process described herein and specifics in the examples can be used anywhere in one or more embodiments.

Example 11 is system including: 1) a memory to store a branch instruction, where a type of the branch instruction is one of a conditional instruction, an unconditional instruction, an indirect jump instruction, a direct jump instruction, a direct call instruction, an indirect call instruction, a return instruction, or a far instruction; and 2) an instruction fetcher to fetch the branch instruction from the memory; 3) an execution circuit to execute the branch instruction; 4) a last branch record (LBR) register including: a) a data field to store data from the branch instruction in response to an execution of the branch instruction; and b) a type field to store information indicating the type of the branch instruction.

In Example 12, the system of Example 11, where the LBR register further includes: 1) a source field to store an address instruction pointer (IP) of the instruction; and 2) a destination field to store an address IP of a target of the instruction.

In Example 13, the system of any one of Examples 11-12, where the LBR register further includes a counter field to store a value of an counter when the instruction is executed, the value of the counter comprises a number of cycles of a processor since addition of an immediately-previous LBR entry to the LBR entry, where the cycles comprise at least one of core clock cycles of the processor or one or more reference clock cycles of the processor.

In Example 14, the system of any one of Examples 11-13, where the LBR register is part of a data structure array circuit.

In Example 15, the system of any one of Examples 11-14, where the LBR register is a model-specific register (MSR).

Various embodiments can have different combinations of the structural features described above. For instance, all optional features of the computing system described above can also be implemented with respect to the method or process described herein and specifics in the examples can be used anywhere in one or more embodiments.

Example 16 is a hardware-implemented method including: 1) executing, by a processor, a first branch instruction of a set of instructions for a program; 2) storing, at a first data field of a first register, a first set of data from executing the first branch instruction; 3) identifying a first keyword in the first branch instruction associated with a type of the first branch instruction; 4) determining the type of the first branch instruction associated with the first keyword; and 5) storing information representative of the type of the first branch instruction at a second data field of the first register.

In Example 17, the hardware-implemented method of Example 16, further including: 1) executing, by the processor, a second branch instruction of the set of instructions for the program; 2) storing, at a first data field of a second register, a second set of data from executing the second branch instruction; 3) identifying a second keyword in the second branch instruction associated with a type of the second branch instruction; 4) determining the type of the second branch instruction associated with the second keyword; and 5) storing information representative of the type of the second branch instruction at a second data field of the second register.

In Example 18, the hardware-implemented method of any one of Examples 16-17, further including: 1) iteratively executing branch instructions of the set of instructions, storing first sets of data, identifying keywords in the branch instructions, and determining types of the branch instructions of the set of instructions; 2) parsing the types of the branch instructions to determine a number of a type of branch instruction for the types of branch instructions; and 3) storing the number at a memory device.

In Example 19, the hardware-implemented method of any one of Examples 16-18, where the types of branch instructions comprise one or more of a conditional instruction, an unconditional instruction, an indirect jump instruction, a direct jump instruction, a direct call instruction, an indirect call instruction, a return instruction, or a far instruction.

In Example 20, the hardware-implemented method of any one of Examples 16-19, further including storing the information at the second data field of the first register when the first branch instruction is retired.

In Example 21, the hardware-implemented method of any one of Examples 16-20, where the first set of data include at least one of a value of a last branch record (LBR) counter, source information for the first branch instruction; or destination information for the first branch instruction Various embodiments may have different combinations of the structural features described above. For instance, all optional features of the computing system described above may also be implemented with respect to the method or process described herein and specifics in the examples may be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computing system have not been described in detail in order to avoid unnecessarily obscuring the present disclosure.

The embodiments are described with reference to access control in specific integrated circuits, such as in computing platforms or microprocessors. The embodiments may also be applicable to other types of integrated circuits and programmable logic devices. For example, the disclosed embodiments are not limited to desktop computing systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. It is described that the system may be any kind of computer or embedded system. The disclosed embodiments may especially be used for low-end devices, like wearable devices (e.g., watches), electronic implants, sensory and control infrastructure devices, controllers, supervisory control, and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices.

Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and may be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, a reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as may be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, wherein the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computing systems have been used. For example, the decimal number ten may also be represented as a binary value of 1010 and a hexadecimal letter A. Therefore, a value includes any representation of information capable of being held in a computing system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplary language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor, comprising:
   a decoder to decode a first branch instruction and a second branch instruction for a program;
   an execution circuit coupled to the decoder, the execution circuit to execute and retire the first branch instruction and the second branch instruction;
   a counter coupled to the execution circuit, the counter to store a cycle count; and
   a first last branch record (LBR) register coupled to the execution circuit, wherein the first LBR register comprises:
      a counter field to store a first cycle count of when the first branch instruction is retired and to store a second cycle count of when the second branch instruction is retired; and
      a type field to store a first multi-bit value corresponding to a first type of the first branch instruction when the first branch instruction is retired and to store a second multi-bit value corresponding to a second type of the second branch instruction when the second branch instruction is retired, the second type being different than the first type, wherein the execution circuit is to determine the first multi-bit value using a first key from the first branch instruction to query a data structure to identify the first multi-bit value corresponding to the first type of the first branch instruction and determine the second multi-bit value using a second key from the second branch instruction to query the data structure to identify the second multi-bit value corresponding to the second type of the second branch instruction.

2. The processor of claim 1, wherein the execution circuit is to:
   identify the first key in the first branch instruction associated with the first type of the first branch instruction, wherein the first key is a sequence of one or more letters or symbols;
   query a lookup table to identify the first multi-bit value associated with the first key; and
   store the first multi-bit value at the type field.

3. The processor of claim 2, wherein the execution circuit is to store the first multi-bit value in the type field when the execution circuit has executed the first branch instruction in-order with a set of instructions.

4. The processor of claim 1, wherein the execution circuit is to:
   identify the first key in the first branch instruction associated with the first type of the first branch instruction, wherein the first key is a sequence of one or more letters or symbols;
   query a database to identify the first multi-bit value associated with the first key; and store the first multi-bit value at the type field while executing the program.

5. The processor of claim 1, wherein the execution circuit further comprises a second LBR register comprising:
   a counter field to store a third cycle count of when a third branch instruction is executed; and
   an type field to store a third multi-bit value corresponding to a third type of the third branch instruction.

6. The processor of claim 1, wherein the first LBR register further comprises:
   a source information field to store source information for the first branch instruction; and
   a destination information field to store destination information for the first branch instruction.

7. The processor of claim 1, wherein the first LBR register is a model specific register (MSR).

8. The processor of claim 7, wherein the first LBR register is one of a stack of MSRs for storing information for a plurality of branch instructions.

9. The processor of claim 1, wherein the first type of the first branch instruction is one of a conditional instruction, an unconditional instruction, an indirect jump instruction, a direct jump instruction, a direct call instruction, an indirect call instruction, a return instruction, or a far instruction.

10. The processor of claim 1, wherein the type field of the first LBR register comprises at least 3 bits.

11. A system comprising:
    a memory to store a branch instruction, wherein a type of the branch instruction is one of a conditional instruction, an unconditional instruction, an indirect jump instruction, a direct jump instruction, a direct call instruction, an indirect call instruction, a return instruction, or a far instruction;
    a processor comprising:
       an instruction fetcher to fetch the branch instruction from the memory;
       an execution circuit to execute the branch instruction;
       a retirement circuit coupled to the execution circuit, the retirement circuit comprising a LBR counter having a counter field to iterate with each cycle of the processor and a type field to store a value indicating a type of the branch instruction; and
       a last branch record (LBR) structure communicably coupled to the LBR counter and comprising a plurality of LBR entries, wherein an LBR entry of the plurality of LBR entries comprises:
          an address instruction pointer (IP) of the branch instruction executed by the processor;
          an address IP of a target of the branch instruction; and
          an elapsed time field that stores a value of the LBR counter when the LBR entry is created; and
          a type field to store a multi-bit value corresponding to the type stored in the LBR counter when the branch instruction is retired by the retirement circuit, wherein the type is determined using a key from the branch instruction to query a data structure to identify the multi-bit value corresponding to the type of the branch instruction.

12. The system of claim 11, wherein the counter field is to store a count value of when the branch instruction is executed, the count value comprises a number of cycles of the processor since an addition of an immediately-previous LBR entry to the LBR structure, wherein the cycles comprise at least one of core clock cycles of the processor or one or more reference clock cycles of the processor.

13. The system of claim 11, wherein the LBR structure is part of a data structure array.

14. The system of claim 11, wherein the LBR structure comprises a model-specific register (MSR).

15. A hardware-implemented method comprising:
executing, by a processor, a first branch instruction of a set of instructions for a program;
recording, by the processor in a first entry of a last branch record (LBR) structure, information about the first branch instruction;
sampling a cycle count of a LBR counter to obtain a first cycle count;
recording the first cycle count in the first entry when the first branch instruction is retired;
determining a first type of the first branch instruction associated with a first keyword in the first branch instruction, the first keyword being associated with the first type of the first branch instruction;
querying a data structure using the first keyword to identify a first multi-bit value representative of the first type of the first branch instruction;
recording the first multi-bit value representative of the first type of the first branch instruction in the first entry of the LBR structure;
executing, by the processor, a second branch instruction of the set of instructions for the program;
recording, by the processor in a second entry of the LBR structure, information about the second branch instruction;
sampling the cycle count of the LBR counter to obtain a second cycle count;
recording the second cycle count in the second entry when the second branch instruction is retired;
determining a second type of the second branch instruction associated with a second keyword in the second branch instruction, the second keyword being associated with the second type of the second branch instruction;
querying a data structure using the second keyword to identify a second multi-bit value representative of the second type of the second branch instruction; and
recording the second multi-bit value representative of the second type of the second branch instruction in the second entry.

16. The hardware-implemented method of claim 15, further comprising:
iteratively executing additional branch instructions of the set of instructions, identifying keywords in the additional branch instructions, determining types of the additional branch instructions of the set of instructions, and storing a multi-bit value in an additional entry of the LBR structure for each of the additional branch instructions;
parsing the type information of the first, second, and additional branch instructions to determine a number of a specified type of branch instruction; and
storing the number at a memory device.

17. The hardware-implemented method of claim 16, wherein the first, second, and additional branch instructions are at least one of a conditional instruction, an unconditional instruction, an indirect jump instruction, a direct jump instruction, a direct call instruction, an indirect call instruction, a return instruction, or a far instruction.

18. The hardware-implemented method of claim 15, wherein the information about the first branch instruction comprises at least one of source information for the first branch instruction or destination information for the first branch instruction.

* * * * *